United States Patent
Ikenishi et al.

(10) Patent No.: US 7,595,272 B2
(45) Date of Patent: *Sep. 29, 2009

(54) OPTICAL GLASS, PRESS-MOLDING PREFORM, PROCESS FOR THE PRODUCTION THEREOF, OPTICAL ELEMENT AND PROCESS FOR THE PRODUCTION THEREOF

(75) Inventors: Mikio Ikenishi, Akishima (JP); Xuelu Zou, Akishima (JP)

(73) Assignee: Hoya Corporation, Tokyo (JP)

( * ) Notice: Subject to any disclaimer, the term of this patent is extended or adjusted under 35 U.S.C. 154(b) by 410 days.

This patent is subject to a terminal disclaimer.

(21) Appl. No.: 11/389,532

(22) Filed: Mar. 27, 2006

(65) Prior Publication Data

US 2006/0223689 A1    Oct. 5, 2006

(30) Foreign Application Priority Data

Mar. 30, 2005 (JP) ............... 2005-099014
Feb. 22, 2006 (JP) ............... 2006-045502

(51) Int. Cl.
*C03C 3/17* (2006.01)
*C03C 3/19* (2006.01)
*C03C 3/16* (2006.01)
*C03C 3/12* (2006.01)
*C03C 3/247* (2006.01)

(52) U.S. Cl. .................. 501/48; 501/45; 501/47; 501/41; 501/44

(58) Field of Classification Search .................. 501/30, 501/41, 44, 48, 43, 45, 47, 49
See application file for complete search history.

(56) References Cited

U.S. PATENT DOCUMENTS 3,508,937 A    4/1970  Bromer et al.
3,656,976 A  *  4/1972  Izumitani et al. ............ 501/44
3,847,624 A  * 11/1974  Broemer et al. ............. 501/44
4,120,814 A   10/1978  Izumitani et al.

(Continued)

FOREIGN PATENT DOCUMENTS

EP    0 709 345 A1    5/1996

(Continued)

*Primary Examiner*—Karl E Group
*Assistant Examiner*—Noah S Wiese
(74) *Attorney, Agent, or Firm*—Nixon & Vanderhye P.C.

(57) ABSTRACT

A low-dispersion optical glass suitable for producing a quality preform from a molten glass and suitable for precision press-molding, which is a fluorophosphate glass containing, as essential cationic components, $P^{5+}$, $Al^{3+}$, at least two members selected from $Mg^{2+}$, $Ca^{2+}$, $Sr^{2+}$ and $Ba^{2+}$ as divalent cationic components ($R^{2+}$) and $Li^+$ and containing, by cationic %, 10 to 45% of $P^{5+}$,
5 to 30% of $Al^{3+}$,
0 to 20% of $Mg^{2+}$,
0 to 25% of $Ca^{2+}$,
0 to 30% of $Sr^{2+}$,
0 to 33% of $Ba^{2+}$,
1 to 30% of $Li^+$,
0 to 10% of $Na^+$,
0 to 10% of $K^+$,
0 to 5% of $Y^{3+}$, and 0 to 15% of $B^{3+}$, the molar ratio of the content of $F^-$ to the total content of $F^-$ and $O^{2-}$, $F^-/(F^-+O^{2-})$, being 0.25 to 0.85,
the optical glass having a refractive index ($N_d$) of 1.40 to 1.58 and an Abbe's number ($v_d$) of 67 to 90.

16 Claims, 1 Drawing Sheet

U.S. PATENT DOCUMENTS

| | | | |
|---|---|---|---|
| 4,427,784 A | | 1/1984 | Nakamura et al. |
| 4,973,345 A | * | 11/1990 | France .................. 65/389 |
| 5,068,209 A | | 11/1991 | Meinert et al. |
| 5,242,868 A | * | 9/1993 | Hara ...................... 501/44 |
| 5,635,109 A | | 6/1997 | Otsuka |
| 2004/0082460 A1 | * | 4/2004 | Yamane et al. ............ 501/48 |
| 2004/0087428 A1 | | 5/2004 | Otsuka et al. |

FOREIGN PATENT DOCUMENTS

| | | | |
|---|---|---|---|
| GB | 781243 | | 8/1957 |
| GB | 2 083 454 A | | 3/1982 |
| JP | 53-105517 A | | 9/1978 |
| JP | 55-47243 | | 4/1980 |
| JP | 55-144448 A | | 11/1980 |
| JP | 2-204342 | | 8/1990 |
| JP | 3-500162 | | 1/1991 |
| JP | 05-238775 | | 9/1993 |
| JP | 9-211505 | | 8/1997 |
| JP | 10-139454 A | | 5/1998 |
| JP | 2004-083290 A | * | 3/2004 |
| JP | 2004-137100 | | 5/2004 |
| JP | 2005-75687 A | | 3/2005 |
| JP | 2005-353718 | | 12/2005 |
| WO | WO 90/00159 | | 1/1990 |

* cited by examiner

OPTICAL GLASS, PRESS-MOLDING PREFORM, PROCESS FOR THE PRODUCTION THEREOF, OPTICAL ELEMENT AND PROCESS FOR THE PRODUCTION THEREOF

FIELD OF THE INVENTION

The present invention relates to a fluorophosphate optical glass, a press-molding preform (a preform for press-molding), a process for the production of the press-molding preform, an optical element and a process for the production of the optical element.

TECHNICAL BACKGROUND

A fluorophosphate glass is very useful as a low-dispersion glass. As such a fluorophosphate glass, a glass described in Japanese National Publication No. 3-500162 of Translated Version is known.

DISCLOSURE OF THE INVENTION

Problems to be Solved by the Invention

When raw materials for a fluorophosphate glass are melted under heat and a molten glass obtained is shaped into a glass product, fluorine in the molten glass evaporates from the glass surface having a high temperature, and the glass product has an optically non-uniform portion called "striae" formed in a layer in the vicinity of the surface thereof.

In the shaping of a molten glass into a glass product, the molten glass is caused to flow out of a pipe and cast into a mold, or the like, to obtain the glass product. In this case, the higher the temperature of the glass that is flowing out is, the more the fluorine evaporates, and striae occur to a greater extent. For reducing the occurrence of striae, it is required to decrease the temperature of the glass that is flowing out. When this temperature is decreased, however, the glass that is flowing out has a high viscosity, and there is involved a problem that excellent separation of molten glass gob is difficult when the gobs are separated from the molten glass flow.

For overcoming the above problem, it is required to provide a glass that exhibits a viscosity suitable for its shaping at a low temperature. Such a glass not only has a low temperature for molten glass shaping but has a glass transition temperature decreased, so that it is suitable for precision press-molding that can highly productively provide optical elements having relatively complicated structures such as an aspherical lens without relying on grinding and polishing.

The present invention has been made under the above circumstances, and it is an object of the present invention to provide a low-dispersion optical glass that is suitable for forming a quality glass from its molten glass and further that is suitable for precision press-molding.

It is another object of the present invention to provide a press-molding preform formed of the above glass and a process for the production thereof, and it is further another object of the present invention to provide an optical element formed of the above glass and a process for the production thereof.

Solution Means

According to the present invention for achieving the above objects, there are provided;

(1) an optical glass that is a fluorophosphate glass comprising, as essential cationic components, $P^{5+}$, $Al^{3+}$, at least two members selected from $Mg^{2+}$, $Ca^{2+}$, $Sr^{2+}$ and $Ba^{2+}$ as divalent cationic components ($R^{2+}$) and $Li^+$ and comprising, by cationic %, 10 to 45% of $P^{5+}$,
5 to 30% of $Al^{3+}$,
0 to 20% of $Mg^{2+}$,
0 to 25% of $Ca^{2+}$,
0 to 30% of $Sr^{2+}$,
0 to 33% of $Ba^{2+}$,
1 to 30% of $Li^+$,
0 to 10% of $Na^+$,
0 to 10% of $K^+$,
0 to 5% of $Y^{3+}$, and
0 to 15% of $B^{3+}$,
the molar ratio of the content of $F^-$ to the total content of $F^-$ and $O^{2-}$, $F^-/(F^-+O^{2-})$, being 0.25 to 0.85,
the optical glass having a refractive index ($N_d$) of 1.40 to 1.58 and an Abbe's number ($v_d$) of 67 to 90, (2) an optical glass as recited in the above (1), which contains, as divalent cationic components ($R^{2+}$), at least two members of $Ca^{2+}$, $Sr^{2+}$ and $Ba^{2+}$, (3) an optical glass as recited in the above (1), wherein a total content of $Mg^{2+}$, $Ca^{2+}$, $Sr^{2+}$ and $Ba^{2+}$ as divalent cationic components ($R^{2+}$) is at least 1 cationic %, (4) an optical glass as recited in the above (1), wherein a content of each of $Mg^{2+}$, $Ca^{2+}$, $Sr^{2+}$ and $Ba^{2+}$ as divalent cationic components ($R^{2+}$) is at least 1 cationic %, (5) an optical glass which is a fluorophosphate glass and which exhibits a viscosity of 30 dPa·s at a temperature of 700° C. or lower, (6) an optical glass as recited in the above (5), which contains 1 to 30 cationic % of $Li^+$, (7) an optical glass as recited in the above (1) or (5), which is for use in precision press-molding, (8) a press-molding preform formed of the optical glass recited in the above (1) or (5), (9) a press-molding preform which is formed from a fluorophosphate optical glass having a glass transition temperature of 450° C. or lower and which is for use in precision press-molding,

(10) a press-molding preform as recited in the above (8) or (9), whose entire surface is formed by solidifying a glass in a molten state,

(11) a process for the production of a press-molding preform, which comprises causing a molten glass to flow out of a pipe, separating a molten glass gob having a predetermined weight and shaping said glass gob into the preform recited in the above (8) or (9) in a glass cooling process,

(12) a process for the production of a press-molding preform as recited in the above (11), wherein a preform surface is removed by etching after said preform is shaped,

(13) a process for the production of a press-molding preform as recited in the above (11), wherein a preform surface is removed by grinding and polishing after said preform is shaped,

(14) a process for the production of a press-molding preform, which comprises shaping a molten glass into a glass shaped material and machining said glass shaped material to produce the preform recited in the above (8) or (9),

(15) an optical element formed of an optical glass recited in the above (1) or (5),

(16) a process for the production of an optical element, which comprises heating and precision press-molding the preform recited in the above (8) or (9) or the preform produced by the process recited in the above (11) or (14),

(17) a process for the production of an optical element as recited in the above (16), wherein said preform is introduced into a press mold and said press mold and the preform are heated together to carry out the precision press-molding, and

(18) a process for the production of an optical element as recited in the above (16), wherein said preform, which is hot after heated, is introduced to a pre-heated press mold to carry out the precision press-molding.

EFFECT OF THE INVENTION

According to the present invention, there can be provided a low-dispersion optical glass that is suitable for shaping a quality glass from a molten glass and further that is suitable for precision press-molding.

According to the present invention, further, there can be provided a press-molding preform formed of the above glass and a process for the production thereof, and there can be also provided an optical element formed of the above glass and a process for the production thereof.

PREFERRED EMBODIMENTS OF THE INVENTION

[Optical Glass]

Figure 1:
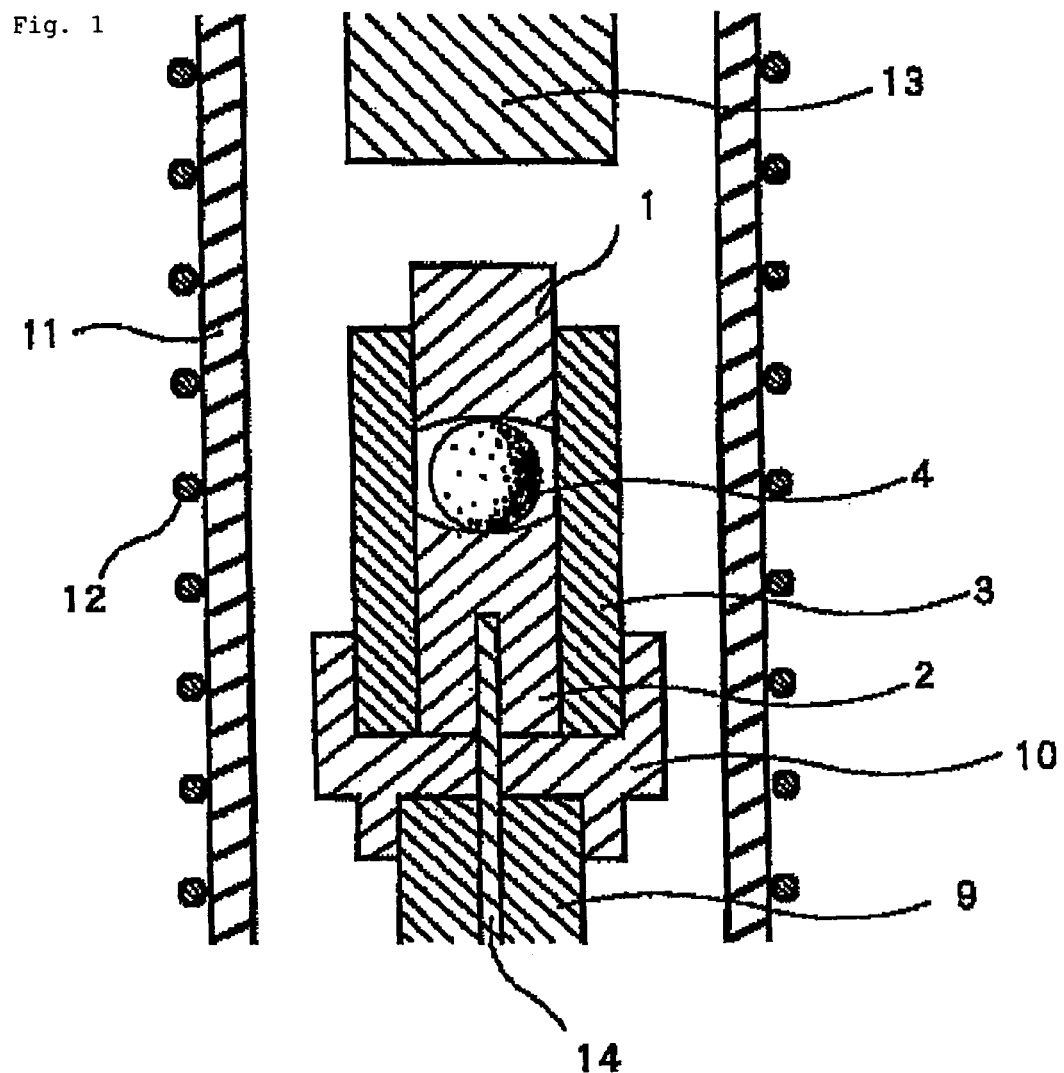
FIG. 1 is a schematic drawing of a precision press-molding apparatus used in Examples of the present invention.

A first embodiment of the optical glass (to be referred to as "optical glass I" hereinafter) of the present invention is a fluorophosphate glass comprising, as essential cationic components, $P^{5+}$, $Al^{3+}$, at least two members selected from $Mg^{2+}$, $Ca^{2+}$, $Sr^{2+}$ and $Ba^{2+}$ as divalent cationic components ($R^{2+}$) and $Li^+$ and comprising, by cationic %, 10 to 45% of $P^{5+}$,
5 to 30% of $Al^{3+}$,
0 to 20% of $Mg^{2+}$,
0 to 25% of $Ca^{2+}$,
0 to 30% of $Sr^{2+}$,
0 to 33% of $Ba^{2+}$,
1 to 30% of $Li^+$,
0 to 10% of $Na^+$,
0 to 10% of $K^+$,
0 to 5% of $Y^{3+}$, and 0 to 15% of $B^{3+}$, the molar ratio of the content of $F^-$ to the total content of $F^-$ and $O^{2-}$, $F^-/(F^-+O^{2-})$ being 0.25 to 0.85, the optical glass having a refractive index ($N_d$) of 1.40 to 1.58 and an Abbe's number ($v_d$) of 67 to 90.

The optical glass I of the present invention preferably contains at least two members selected from $Ca^{2+}$, $Sr^{2+}$ and $Ba^{2+}$ as divalent cationic components ($R^{2+}$).

Further, in the optical glass I of the present invention, preferably, the total content of $Mg^{2+}$, $Ca^{2+}$, $Sr^{2+}$ and $Ba^{2+}$ as divalent cationic components ($R^{2+}$) is at least 1 cationic %. More preferably, the content of each of $Mg^{2+}$, $Ca^{2+}$, $Sr^{2+}$ and $Ba^{2+}$ as divalent cationic components ($R^{2+}$) is at least 1 cationic %.

The above optical glass I will be explained in detail with regard to its composition hereinafter. With regard to cationic component contents to be described hereinafter, % stands for cationic % based on molar ratio, and with regard to anionic component contents to be described hereinafter, % stands for anionic % based on molar ratio.

The optical glass I is largely divided into an optical glass Ia in which the molar ratio of the content of $F^-$ to the total content of $F^-$ and $O^{2-}$, $F^-/(F^-+O^{2-})$ is 0.50-0.85 and which has an Abbe's number ($v_d$) of 75 to 90 and an optical glass Ib in which the molar ratio of the content of $F^-$ to the total content of $F^-$ and $O^{2-}$, $F^-/(F^-+O^{2-})$, is 0.25-0.50 (exclusive of 0.50) and which has an Abbe's number ($v_d$) of 67 to 75 (exclusive of 75). For obtaining these optical glasses Ia and Ib, there are differences between preferred ranges of contents of cationic components of the optical glass Ia and preferred ranges of contents of cationic components of the optical glass Ib.

$P^{5+}$ is an important cationic component as a network former of the glass. When the content thereof is less than 10%, the glass stability is decreased. When it is over 45%, the content of oxygen is large since $P^{5+}$ needs to be introduced in the form of an oxide which is derived from phosphates used as a new material, and no intended optical properties are satisfied. The content of $P^{5+}$ is therefore limited to the range of 10 to 45%. For obtaining the optical glass Ia, the content of $P^{5+}$ is preferably in the range of 10 to 40%, more preferably 10 to 35%, still more preferably 12 to 35%, yet more preferably 20 to 35%, most preferably 20 to 30%. For obtaining the optical glass Ib, the content of $P^{5+}$ is preferably 25 to 45%, more preferably 25 to 40%, still more preferably 30 to 40%. It is not proper to use $PCl_5$ for introducing $P^{5+}$, since $PCl_5$ corrodes platinum used as a material of a melting vessel and violently volatilizes, hindering stable production. $P^{5+}$ is preferably introduced in the form of phosphates.

$Al^{3+}$ is a component for improving the fluorophosphate glass in stability. When the content thereof is less than 5%, the glass is decreased in stability. When it is over 30%, the glass transition temperature ($T_g$) and the liquidus temperature (LT) greatly increase, so that the shaping temperature is increased. In this case, striae are intensely generated due to surface volatilization during the stage of shaping, so that uniform glass shaped products, in particular press-molding preforms can be no longer produced. The content of $Al^{3+}$ is limited to 5 to 30%. For obtaining the optical glass Ia, the content of $Al^{3+}$ is preferably in the range of 7 to 30%, more preferably 8 to 30%, still more preferably 10 to 30%, yet more preferably 15 to 25%. For obtaining the optical glass Ib, the content of $Al^{3+}$ is preferably 5 to 20%, more preferably 5 to 12%.

$Mg^{2+}$, $Ca^{2+}$, $Sr^{2+}$ and $Ba^{2+}$ as a divalent cationic component ($R^{2+}$) serves for an improvement in the glass stability when introduced. Of these, two members or more are introduced, and more preferably, at least two members of $Ca^{2+}$, $Sr^{2+}$ and $Ba^{2+}$ are introduced. For more improving the effect of the divalent cationic components ($R^{2+}$), preferably, the total content of $Mg^{2+}$, $Ca^{2+}$, $Sr^{2+}$ and $Ba^{2+}$ is adjusted to 1 cationic % or more. Further, when the content of each of these exceeds its upper limit, the stability is sharply degraded. While $Ca^{2+}$ and $Sr^{2+}$ can be introduced in a relatively large amount, $Mg^{2+}$ and $Ba^{2+}$ particularly degrade the stability when introduced in a large amount. Since, however, $Ba^{2+}$ is a component that can realize high refractivity while maintaining low-dispersion, so that it is preferred to introduce a larger amount of $Ba^{2+}$ so long as the stability of the glass is not impaired. Therefore, the content of $Mg^{2+}$ is limited to 0 to 20%, and for obtaining the optical glass Ia, the content of $Mg^{2+}$ is preferably 1 to 20%, more preferably 3 to 17%, still more preferably 3 to 15%, yet more preferably 5 to 15%, particularly preferably 5 to 10%. For obtaining the optical glass Ib, the content of $Mg^{2+}$ is preferably 0 to 15%, more preferably 0 to 12%, still more preferably 1 to 10%.

Further, the content of $Ca^{2+}$ is 0 to 25%. For obtaining the optical glass Ia, the content of $Ca^{2+}$ is preferably 1 to 25%, more preferably 3 to 24%, still more preferably 3 to 20%, yet more preferably 5 to 20%, particularly preferably 5 to 16%. For obtaining the optical glass Ib, the content of $Ca^{2+}$ is preferably 0 to 15%, more preferably 1 to 10%.

Further, the content of $Sr^{2+}$ is 0 to 30%, and for obtaining the optical glass Ia, the content of $Sr^{2+}$ is preferably 1 to 30%, more preferably 5 to 25%, still more preferably 7 to 25%, yet more preferably 8 to 23%, further more preferably 9 to 22%, particularly preferably 10 to 20%. For obtaining the optical glass Ib, the content of $Sr^{2+}$ is preferably 0 to 15%, more preferably 1 to 15%, still more preferably 1 to 10%.

The content of $Ba^{2+}$ is 0 to 33%, and for obtaining the optical glass Ia, the content of $Ba^{2+}$ is preferably 0 to 30%, more preferably 0 to 25%, still more preferably 1 to 25%, yet more preferably 1 to 20%, further more preferably 3 to 18%, further more preferably 5 to 15%, particularly preferably 8 to 15%. For obtaining the optical glass Ib, the content of $Ba^{2+}$ is preferably 0 to 30%, more preferably 10 to 30%, still more preferably 15 to 30%, yet more preferably 15 to 25%.

$Li^+$ is an important component for decreasing the glass transition temperature ($T_g$) without impairing the glass stability. However, when the content thereof is less than 1%, the above effect is not sufficient. When it is over 30%, the durability of the glass is impaired, and at the same the processability of the glass is degraded. Therefore, the content of $Li^+$ is limited to 1 to 30%, and it is preferably 2 to 30%, more preferably 3 to 30%, still more preferably 4 to 30%. For obtaining the optical glass Ia, the content of $Li^+$ is preferably 4 to 25%, more preferably 5 to 25%, and for obtaining the optical glass Ib, it is preferably 5 to 30%, more preferably 10 to 25%.

$Na^+$ and $K^+$ have an effect on a decrease in the glass transition temperature ($T_g$) like $Li^+$, respectively, while they tend to make the thermal expansion coefficient of the glass larger than $Li^+$. Further, NaF and KF have a very large water solubility as compared with LiF and degrade the water resistance of the glass, so that the content of each of $Na^+$ and $K^+$ is limited to 0 to 10%. In any one of the optical glasses Ia and Ib, the content of each of $Na^+$ and $K^+$ is preferably in the range of 0 to 5%, and more preferably, they are not introduced.

$Y^{3+}$ has an effect on improvements of the glass in stability and durability. When the content of $Y^{3+}$ is over 5%, the stability is degraded to the contrary, and the glass transition temperature ($T_g$) is also increased to a great extent, so that the content of $Y^{3+}$ is limited to 0 to 5%. For obtaining the optical glass Ia, the content of $Y^{3+}$ is preferably 0 to 3%, more preferably 0.5 to 3%, and for obtaining the optical glass Ib, the content of $Y^{3+}$ is 0 to 4%, more preferably 0 to 3%, still more preferably 0.5 to 3%.

$B^{3+}$ is a glass-forming component and hence has a stabilizing effect on the glass. However, when introduced to excess, it degrades the durability of the glass, and with an increase in the content $B^{3+}$, the content of $O^{2-}$ in the glass increases, so that it is difficult to attain the intended optical properties. The content of $B^{3+}$ is therefore limited to 0 to 15%. Since, however, it is easily volatilized in the form of $BF_3$ during a melting stage and hence causes striae, the content of $B^{3+}$ in both the optical glasses Ia and Ib is preferably limited to 0 to 10%, more preferably 0 to 5%. When priority is given to the reduction of the volatilization of the glass, the content of $B^{3+}$ is preferably limited to 0 to 0.5%, and it is more preferred to introduce no $B^{3+}$.

For stably producing quality optical glasses, the total content of $P^{5+}$, $Al^{3+}$, $Mg^{2+}$, $Ca^{2+}$, $Sr^{2+}$, $Ba^{2+}$, $Li^+$ and $Y^{3+}$ by cationic % in each of the optical glasses Ia and Ib is preferably adjusted to over 95%, more preferably to over 98%, still more preferably to over 99%, yet more preferably to over 100%.

The optical glass I of the present invention may contain, as cationic components, lanthanoids such as Ti, Zr, Zn, La, Gd, etc., other than the above cationic components, in such amount ranges that they do not impair the object of the present invention.

Further, $Si^{4+}$ may be introduced for stabilization of the glass. Since, however, a low temperature is employed for melting an optical glass, $Si^{4+}$ may remain non-melted when introduced in an excess amount, or volatilization occurs to a greater extent during a melting stage, and the production stability is impaired. In each of the optical glasses Ia and Ib, therefore, the content of $Si^{4+}$ is preferably limited to 0 to 10%, more preferably to 0 to 8%, still more preferably to 0 to 5%.

With regard to content ratios of anionic components, for obtaining an optical glass having excellent stability while realizing the desired optical properties, the molar ratio of the content of $F^-$ to the total content of $F^-$ and $O^{2-}$, $F^-/(F^-+O^{2-})$, is adjusted to 0.25-0.85. In the optical glass Ia, the above molar ratio is preferably adjusted to 0.50-0.85, and in the optical glass Ib, the above molar ratio is preferably adjusted to 0.25-0.50 (exclusive of 0.50), preferably to 0.27-0.45, more preferably to 0.30-0.45. Further, in each of the optical glasses Ia and Ib, preferably, the total content of $F^-$ and $O^{2-}$ in the entire anion content is adjusted to 100%.

In the optical glass I of the present invention, the refractive index ($N_d$) is 1.40 to 1.58, and the Abbe's number ($v_d$) is 67 to 90, preferably 70 to 90. Further, in the optical glass Ia, the above Abbe's number ($v_d$) is 75 to 90, preferably 79 to 89, and in the optical glass Ib, the above Abbe's number ($v_d$) is 67 to 75 (exclusive of 75).

The optical glass I exhibits high transmittance in the visible light region unless a colorant is added. When a sample having flat surfaces in parallel with each other and having a thickness of 10 mm is prepared from the optical glass I of the present invention and light is caused to enter the sample from the direction perpendicular to the above surfaces, transmittance (excluding a reflection loss on the sample surfaces) of the optical glass I of the present invention at a wavelength of 400 nm to 2,000 nm is at least 80%, preferably at least 95%.

The optical glass I of the present invention has the specific content of $Li^+$, it has a glass transition temperature ($T_g$) of 470° C. or lower, preferably 430° C. or lower. Further, since $Li^+$ is incorporated dominantly out of alkali metal ions, the optical glass I of the present invention has a relatively small thermal expansion coefficient and also exhibits relatively superior water resistance. Therefore, the glass can be formed into a press-molding preform by polishing, or a quality optical element having a smooth glass surface can be formed by processing.

The optical glass I of the present invention exhibits excellent water resistance and chemical durability. Therefore, when press-molding preforms are produced and stored for a long period of time before press molding, the preforms do not suffer any surface alternation. Further, since optical elements formed of the optical glass I of the present invention are not easily altered on surfaces, either, the optical elements can be used in a good condition free of cloudiness on surfaces for a long period of time.

According to the optical glass I of the present invention, further, the glass melting temperature can be decreased by approximately 50° C. as compared with a glass that has optical constants equivalent to those of the optical glass I of the present invention but does not contain Li, so that defects such as coloring of glass, inclusion of bubbles and striae caused by dissolving of platinum from a vessel during a melting stage can be decreased or overcome.

A fluorophosphate glass generally has a high viscosity when caused to flow out and has the following defect. When a molten glass gob having a predetermined weight is separated from a molten glass of the fluorophosphate glass that is flowing out and shaped into a certain form, the glass forms a narrow thread from a separation portion, and a thread-like portion remains on the glass gob surface to form a projection. When attempts are made to overcome the above defect by decreasing the viscosity of the glass that is flowing out, it is required to increase the temperature of the glass that is flowing out, and there is hence involved the above problem that striae are intensely caused since the volatilization of fluorine from the glass surface is promoted.

In the optical glass I of the present invention, the temperature suitable for molten glass shaping is decreased for overcoming the above problems, and for this purpose, the glass composition thereof is determined such that the temperature of the glass at which the glass exhibits a predetermined viscosity is lower than the temperature of a conventional fluorophosphate glass. A glass transition temperature is far lower than the temperature for shaping a molten glass, and when the glass has a low glass transition temperature, the above temperature for shaping a molten glass can be also decreased. For overcoming the formation of a thread, striae, etc., during the shaping stage, therefore, the glass composition is adjusted so that the glass has a glass transition temperature in the above range.

Further, when the glass transition temperature is decreased, the temperature for heating a preform in press-molding, in particular, precision press-molding can be decreased, and there can be hence produced an effect that a reaction between the glass and a press mold is moderated or that the lifetime of the press mold can be increased.

Therefore, the optical glass I of the present invention is suitable as a glass material for press-molding, in particular as a glass material for precision press-molding.

In addition, the optical glass of the present invention can be obtained by preparing phosphate materials, fluoride materials, etc., weighing these materials, mixing them, supplying a mixture to a melting vessel made of a platinum alloy, carrying out heating, melting, refining and homogenization, causing the resultant glass to flow out of a pipe and shaping (molding) the glass.

Next, a second embodiment of the optical glass (to be referred to as "optical glass II" hereinafter) of the present invention is explained.

The optical glass II of the present invention is a fluorophosphate glass and has a characteristic feature that the temperature at which the glass exhibits a viscosity of 30 dPa·s is 700° C. or lower.

Like the optical glass I, in the optical glass II, a glass containing 1 to 30 cationic % of $Li^+$ is preferred, a glass containing 2 to 30 cationic % of $Li^+$ is more preferred, a glass containing 3 to 30 cationic % of $Li^+$ is still preferred, and a glass containing 4 to 30 cationic % of $Li^+$ is yet more preferred.

Preferred glass compositions and optical constants of the optical glass II are in common with the glass compositions and optical glass constants of the optical glass I. Therefore, preferred glass components, their contents, optical constants and other properties of the optical glass II are also in common with the counterparts of the above-described optical glass I. The optical glass II is not necessarily required to satisfy all of the requirements of the kinds and contents of the glass components of the optical glass I. The optical glass II preferably satisfies some of the requirements of the kinds and contents of the glass components constituting the optical glass I, and it more preferably satisfies all of the requirements.

The optical glass II of the present invention overcomes the problems of formation of a tread of a molten glass, striae, and the like.

The above formation of a thread during a shaping stage can be overcome by decreasing the preform-shaping temperature (temperature immediately after a molten glass is caused to flow out) so as to decrease the viscosity of the glass. On the other hand, it is preferred to decrease the preform-shaping temperature for decreasing or preventing striae during the shaping stage. It has been difficult for any conventional fluorophosphate glass to satisfy these two requirements. However, the present inventors have found that the lower limit of the preform-shaping temperature (temperature immediately after the glass is caused to flow out) at which the formation of a thread can be prevented corresponds to a temperature at which the glass exhibits a viscosity of 30 dPa·s, and the striae can be reduced or prevented while preventing the formation of a thread by providing an optical glass that exhibits the above viscosity at 700° C. or lower.

In addition, the optical glass I also preferably exhibits a viscosity of 30 dPa·s at a temperature of 700° C. or lower is preferred, and both the optical glasses I and II more preferably exhibit a viscosity of 30 dPa·s at a temperature of 680° C. or lower.

[Press-Molding Preform and Process for the Production Thereof]

A first embodiment of the press-molding preform of the present invention has a characteristic feature that it is formed of the optical glass of the present invention.

The preform as used herein refers to a product obtained by pre-shaping a glass having a weight equivalent to the weight of a press molded product as an end product, to a form suitable for press molding.

For example, for producing a press molded product that has one axis of rotational symmetry and that is symmetrical with regard to any rotation angle about this axis of rotational symmetry, such as a lens, it is preferred to shape a preform that also has one axis of rotational symmetry and that is also symmetrical with regard to any rotation angle about this axis of rotational symmetry, or to shape a preform that has a spherical form. Further, when press molding is carried out, the form accuracy of a press molded article may be decreased since the press molding is carried out in a state an ambient atmosphere gas is included between the molding surface of a press mold and the surface of a preform. For preventing such a phenomenon, desirably, the curvature of the preform surface is determined by taking account of the curvature of the molding surface of the press mold. The press-molding preform of the present invention is particularly suitable as a preform for precision press-molding. When the press-molding preform of the present invention is used as a precision press-molding preform, a known film having a function to sufficiently spread the glass in a press mold during a precision press-molding stage or a known film for improving mold releasability may be formed on the entire surface of the preform.

A second embodiment of the press-molding preform (to be referred to as "preform II" hereinafter) of the present invention has a characteristic feature that it is formed of a fluorophosphate glass having a glass transition temperature of 450° C. or lower and is used in precision press-molding. In the preform II of the present invention, the glass transition temperature is preferably 440° C. or lower, more preferably 430° C. or lower, still more preferably 420° C. or lower, yet more preferably 410° C. or lower, further more preferably 400° C. or lower.

While fluorophosphate glasses generally have a low glass transition temperature, the fluorophosphate glass constituting the preform II is a glass that has a particularly low glass transition temperature. It has been thought that fluorophosphate glasses have no particular problem for precision press-molding since they generally have low glass transition temperatures. However, it has been difficult to produce optical elements therefrom by precision press-molding at high yields. The reason therefor is as follows. General fluorophosphate glasses have glass transition temperatures of over 460° C. to 600° C. or less, and such fluorophosphate glasses have a narrow range of temperatures suitable for precision press-molding. Therefore, when the glass temperature is even slightly decreased during a precision press-molding stage, the glass is broken. When the glass temperature is even slightly increased, the glass foams, and quality optical elements can be no longer obtained.

In contrast, according to the preform II of the present invention, the glass transition temperature is controlled such that it is 450° C. or lower, so that the temperature design range for precision press-molding can be broadened, and optical elements free of breaking and bubbling can be stably produced.

Further, since the glass transition temperature is lowered, the temperature for annealing after precision press-molding can be lowered. Annealing is carried out in the temperature range that is lower than the glass transition temperature by 10° C. to 50° C., so that the optimum temperature for the annealing changes in conjunction with the glass transition temperature. When the annealing temperature is high, fluorine present on the surface of a precision press-molded product is partially replaced with oxygen in an ambient atmosphere, and the refractive index of a surface layer of the optical element increases to a slight extent. This phenomenon is influenced by the level of the annealing temperature. For forming an optical multi-layer film such as an anti-reflection film on an optical element, an optimum optical multi-layer film is designed in conformity with optical properties of a glass. Even if such an optimum optical multi-layer film is designed, an actually formed optical multi-layer film deviates from an optimum one due to the above change in the refractive index of a surface layer.

Since, however, the preform II of the present invention is used, the annealing temperature can be decreased, and the above replacement of fluorine by oxygen can be hence suppressed, so that it can be secured that the refractive index of the optical element surface does not change. Therefore, the design of an optical multi-layer film can be optimized on the basis of optical properties of the glass. Further, due to the use of the preform II, the temperature for precision press-molding can be decreased, so that the time period required for temperature elevation before precision press-molding and the time period required for decreasing the temperature of a glass molded product after the precision press-molding can be decreased, which can result in an improvement in productivity. For controlling the glass transition temperature of the preform II of the present invention so that it is 450° C. or lower, it is preferred to introduce Li cation as a glass component, and it is more preferred to adjust the content of the Li cation to 1 to 30 cationic %. Further, desirably, the contents of anion components are determined such that the molar ratio of the content of $F^-$ to the total content of $F^-$ and $O^{2-}$, $F^-/(F^- + O^{2-})$ is from 0.25 to 0.85. The fluorophosphate optical glass constituting the preform II of the present invention preferably satisfies one or some of the foregoing requirements of the components of the optical glass I, and more preferably satisfies all of the foregoing requirements.

The preform II is preferably a preform that has the constitution of the preform I, that is, a preform that is formed of the optical glass of the present invention.

Further, the entire surface of each of the preforms I and II is preferably a surface formed by solidifying a glass in a molten state.

When each of the preforms I and II is constituted from a fluorophosphate glass having a transmittance characteristic that the external transmittance converted into a thickness of 10 mm of the glass is 80% or more in an entire region of wavelength of 370 to 700 nm, colorless and transparent optical elements suitable as optical elements such as a lens, a prism, a diffraction grating, etc., can be produced by precision press-molding.

The process for the production of a press-molding preform, provided by the present invention, will be explained below.

A first embodiment of the process for the production of a press-molding preform (to be referred to as "preform production process I" hereinafter), provided by the present invention, comprises causing a molten glass to flow out of a pipe, separating a molten glass gob having a predetermined weight and shaping the glass gob to a preform formed of the above optical glass of the present invention in a glass cooling process.

The above molten glass is prepared as described already. A molten glass is caused to continuously and at a constant rate flow out of a pipe made of a platinum alloy or platinum which pipe is heated to a predetermined temperature by an electric heating method, a high frequency dielectric heating method or a heating method combining these two methods. From a molten glass that has flowed out, there is separated a molten glass gob having a weight that is equivalent to a weight of one preform or that is obtained by adding a weight of a portion to be removed as will be described later to a weight of one preform. When a molten glass gob is separated, it is desirable to use no cutting blade, so that a cutting mark does not remain. For example, it is preferred to employ a method in which a molten glass is caused to drop from the outlet of a pipe or a method in which a leading end of a molten glass that is flowing out is supported by a support and the support is rapidly moved downward at a time when a molten glass gob having a predetermined weight can be separated, to separate the molten glass gob from the leading end of the molten glass gob by utilizing the surface tension of the molten glass.

In addition, when the temperature for causing a molten glass to flow out was set at a temperature of 700° C. or lower, glasses that exhibited a viscosity of 30 dPa·s at a temperature of 700° C. or lower did not show any thread-forming phenomenon caused by the above separation of a molten glass.

The molten glass gob separated is shaped into a predetermined form on a convex portion of a preform shaping mold in a glass cooling process. In this case, for preventing the formation of a wrinkle on the preform surface or damage of a glass called cracking during a glass cooling process, preferably, the shaping is carried out in a state where a gas pressure is upwardly applied to the glass gob above the concave portion.

After the glass temperature lowers to a temperature region in which the glass is not deformed by an external force, the preform is taken out of the preform shaping mold and gradually cooled.

For decreasing the volatilization of fluorine from the glass surface, it is preferred to cause the glass to flow out and shape the preform in a dry atmosphere (dry atmosphere having a dew point of −50° C. or lower).

While the above optical glass of the present invention does not easily have striae, if the preform has slight striae on its surface, a surface layer is removed by etching or polishing since the striae is locally existent in the surface layer, so that an optically highly uniform preform free of striae can be completed.

When the above etching is carried out, the preform may be immersed in an etching solution of an acid or alkali, or such an etching solution is sprayed on the entire surface of the preform, to remove the surface layer so that the entire surface of the preform is removed. After the etching, the preform is cleaned and dried.

When the surface layer is removed by polishing, it is desirable to remove a surface layer so that the entire surface of the preform is removed. The polishing is suitable for a spherical preform or a preform having flat surfaces, and the etching has nothing to do with a form and can cope with various forms.

In the case of any one of the etching and polishing, it is desirable to separate a molten glass gob having a weight obtained by adding a weight of the surface layer to be removed to a weight of one preform in order to have a predetermined weight after the removal of the surface layer.

A second embodiment of the process for the production of a press-molding preform (to be referred to as "preform production process II" hereinafter), provided by the present invention, comprises shaping a molten glass into a glass shaped material and machining the glass shaped material to produce a preform formed of the optical glass of the present invention.

The above molten glass is prepared as described already. The method of removing the entire surface of a preform in the preform production process I also corresponds to the preform production method II in which a glass shaped material is machined. Methods other than those explained with regard to the preform production process I will be explained below.

First, a molten glass is caused to continuously flow out of a pipe to cast it into a casting mold. The casting mold to be used has a flat bottom and three sides formed of a side wall each with remaining one side open. The casting mold is arranged and fixed such that two side walls adjacent to the open side and the bottom are opposed to each other in parallel, that the center of the bottom surface is positioned right below the outlet of the pipe and that the bottom surface is positioned horizontally. A molten glass that is caused to flow into the casting mold is spread in a region surrounded by the side walls so as to have a uniform thickness, and cooled glass is withdrawn in the horizontal direction from the opening of the open side at a constant rate. The withdrawn shaped material is transferred into an annealing furnace and annealed. In this manner, there is obtained a plate-like glass shaped material formed of the optical glass of the present invention, and having a constant width and a constant thickness.

Then, the plate-like glass shaped material is cut or split to divide it into a plurality of glass pieces called "cut piece", and the glass pieces are ground and polished to complete press-molding preforms having a predetermined weight each.

As another method, a casting mold having a cylindrical through hole is arranged and fixed right below the outlet of the pipe such that the central axis of the through hole is in the vertical direction. In this case, preferably, the casting mold is arranged such that the central axis of the through hole is positioned right below the outlet of the pipe. Then, a molten glass is caused to flow into the through hole of the casting mold from the pipe to fill the through hole with glass, and solidified glass is withdrawn vertically downward from a lower end opening portion of the through hole at a constant rate and gradually cooled to obtain a columnar rod-shaped glass shaped material. The thus-obtained glass shaped material is annealed, and then cut or split from the direction perpendicular to the central axis of the columnar rod-shaped glass shaped material, to obtain a plurality of glass pieces. Then, the glass pieces are ground and polished to complete press-molding preforms having a predetermined weight each.

Both the preform production processes I and II are suitable as a process for the production of a precision press-molding preform since they enable the production of quality preforms having high weight accuracy.

[Process for the Production of Optical Element]

The optical element of the present invention has a characteristic feature that it is formed of the optical glass of the present invention. The optical element of the present invention is formed of the above optical glass of the present invention, so that there can be provided optical elements making efficient use of low-dispersion. Further, the optical element is formed of the glass excellent in water resistance and chemical durability, so that there can be provided optical elements free from defects such as surface cloudiness caused by use for a long period of time.

The optical element is not specially limited with regard to its kind, form, and the like. The optical element is suitable as an aspherical lens, a spherical lens, a microlens, a lens array, a prism, a diffraction grating, a prism with a lens, a lens with a diffraction grating, or the like. Specific examples of the aspherical lens and spherical lens include a convex meniscus lens, a concave meniscus lens, a biconvex lens, a biconcave lens, a planoconvex lens, a planoconcave lens, etc.

From the viewpoint of use, the optical element is suitable as an optical element for constituting an image sensing device, such as a lens for a digital camera, a lens for a camera of a camera cellphone, an optical pickup lens, a collimator, etc.

The surface of the optical element may be provided with an optical thin film such as an anti-reflection film as required.

The process for the production of an optical element, provided by the present invention, will be explained below.

The process for the production of an optical element, provided by the present invention, comprises heating the press-molding preform of the present invention or a press-molding preform produced by the process for the production of a press-molding preform, provided by the present invention, and precision press-molding the preform.

The above precision press-molding is also called "mold optics molding" and is well known in the field of the present invention. In an optical element, a surface that transmits, refracts, diffracts or reflects light is referred to as optical-function surface (for example, a lens surface such as an aspherical surface of an aspherical lens or a spherical surface of a spherical lens corresponds to the optical-function surface). In the precision press-molding, the form of molding surface of a press mold is precisely transferred to a glass, whereby the optical-function surface can be formed by press molding, and it is not required to apply machine processes of grinding, polishing, etc., for completing the optical-function surface.

Therefore, the process for the production of an optical element, provided by the present invention, is suitable for producing optical elements such as a lens, a lens array, a diffraction grating, a prism, and the like, and it is particularly suitable for highly productively producing aspherical lenses.

According to the process for the production of an optical element, provided by the present invention, optical elements having the above optical properties can be produced, and in addition to this, the temperature for the press molding can be lowered since the glass transition temperature ($T_g$) of the glass is low, so that damage to the molding surface of a press mold is reduced and that the lifetime of the press mold can be hence increased. Further, since the glass constituting a preform has high stability, the devitrification of the glass can be effectively prevented even in the steps of reheating and pressing. Furthermore, a series of steps starting with melting and finishing with the completion of an end product can be highly productively carried out.

As press mold for precision press-molding, there can be used a known press mold such as a press mold obtained by providing a mold release film on the molding surface of a refractory ceramic mold material such as silicon carbide, zirconia, alumina or the like. Above all, a press mold made of silicon carbide is preferred, and a carbon-containing film or the like may be used as a mold release film. A carbon film is particularly preferred in view of durability and a cost.

In the precision press-molding, desirably, a non-oxidizing gas is used as an atmosphere during molding, for maintaining the molding surface of a press mold in a good state. The non-oxidizing gas is preferably selected from nitrogen, a mixture of nitrogen with hydrogen, or the like.

The precision press-molding employed for the production of an optical element, provided by the present invention, includes the following two embodiments of precision press-molding 1 and precision press-molding 2.

(Precision Press-Molding 1)

The precision press-molding 1 is a method in which the above preform is introduced into a press mold and the press mold and the preform are heated together to carry out precision press-molding.

In the above precision press-molding 1, the press mold and the preform are heated to a temperature at which a glass constituting the preform exhibits a viscosity of $10^6$ to $10^{12}$ dPa·s to carry out precision press-molding.

Further, desirably, a precision press-molded product is preferably cooled to a temperature at which the above glass exhibits a viscosity of at least $10^{12}$ dPa·s, more preferably at least $10^{14}$ dPa·s, still more preferably at least $10^{16}$ dPa·s, before the precision press-molded product is taken out of the press mold.

Under the above conditions, the form of molding surface of the press mold can be precisely transferred to the glass, and the precision press-molded product can be taken out without deforming it.

(Precision Press-Molding 2)

The precision press-molding 2 is a method in which a pre-heated preform is introduced into a pre-heated press mold to carry out precision press-molding.

According to the precision press-molding 2, the above preform is pre-heated before introduced into the press mold, so that optical elements being free of surface defects and having excellent surface accuracy can be produced while decreasing a cycle time.

It is preferred to set the temperature for pre-heating the press mold at a temperature lower than the temperature for pre-heating the preform. Since the temperature for pre-heating the press mold is set at a lower temperature, the abrasion of the press mold can be decreased.

In the precision press-molding 2, the glass constituting the preform is preferably heated to a temperature at which the glass exhibits a viscosity of $10^9$ dPa·s or lower, more preferably $10^9$ dPa·s.

Further, preferably, the above preform is pre-heated while causing it to float, and it is more preferred to pre-heat the preform to a temperature at which the glass constituting the preform exhibits a viscosity of $10^{5.5}$ to $10^9$ dPa·s, still more preferably to a temperature at which the above glass exhibits a viscosity of at least $10^{5.5}$ dPa·s but less than $10^9$ dPa·s.

Further, it is preferred to start the cooling of the glass concurrently with the start of pressing or while the pressing is carried out.

The temperature of the press mold is adjusted to a temperature lower than the above temperature for pre-hating the preform, while a temperature at which the above glass exhibits a viscosity of $10^9$ to $10^{12}$ dPa·s can be used as a target.

In this process, preferably, the precision press-molded product is taken out of the mold after it is cooled until the above glass has a viscosity of a viscosity of at least $10^{12}$ dPa·s.

An optical element obtained by precision press-molding is taken out of the press mold, and it is gradually cooled as required. When the molded product is an optical element such as a lens, the molded product may be surface-coated with an optical thin film as required.

The process for the production of an optical element, provided by the present invention, is as explained hereinabove. In addition to the above process, for example, the optical element of the present invention can be produced by causing a molten glass to flow out to form a glass shaped material, annealing it and then machining it. For example, the above columnar rod-like glass shaped material is sliced in the direction perpendicular to the axis of the column, and the resultant columnar glass is ground and polished. In this manner, optical elements such as various lenses can be produced.

EXAMPLES

The present invention will be explained further in detail with reference to Examples hereinafter, while the present invention shall not be limited by these Examples.

Phosphates, fluorides, etc., corresponding to glass components were used as raw materials for a glass. These raw materials were weighed so as to obtain a glass having a composition shown in Table 1 and fully mixed, and the mixture is placed in a platinum crucible. The mixture was melted under heat with stirring in an electric furnace at a temperature in the range of 850 to 950° C. in atmosphere for 1 to 3 hours. A homogenized and refined glass melt was cast into a 40×70× 15 mm mold made of carbon. The cast glass was gradually cooled to a glass transition temperature and immediately thereafter it was introduced into an annealing furnace and annealed at a temperature around the transition temperature for 1 hour. In the annealing furnace, the glass was gradually cooled to room temperature. In this manner, optical glasses shown in Tables 1-1 and 1-2 were obtained.

The thus-obtained glasses were observed by enlarging them through a microscope to show no precipitation of a crystal or no remaining non-melted material.

The above-obtained optical glasses were measured for a refractive index ($N_d$), an Abbe's number ($v_d$), a glass transition temperature ($T_g$) and a temperature at which a viscosity of 30 dPa·s was exhibited, by the following methods. Table 1 shows the results.

(1) Refractive Index ($N_d$) and Abbe's Number ($v_d$)

An optical glass obtained by gradually cooling at a rate of −30° C./hour was measured.

(2) Glass Transition Temperature ($T_g$)

An optical glass was measured at a temperature elevation rate of 4° C./minute with an apparatus for thermomechanical analysis (trade name: Thermoplas TMA 8310) supplied by Rigaku Corporation.

(3) Temperature at which Glass Exhibits a Viscosity of 30 dPa·s

A measurement is carried out with a co-axial double rotary cylindrical rotational viscometer (high-temperature viscosity measuring apparatus RHEOTRONIC II (improved type) supplied by Tokyo Kogyo K.K.) according to a viscosity measurement method of JIS Z8803. For determining a temperature at which a viscosity of 30 dPa·s is exhibited, it is easy and simple to employ a method in which a glass is measured for a viscosity at each of various temperatures, a graph showing a relationship between the viscosity and the temperature is prepared, and the temperature at which a viscosity of 30 dPa·s is exhibited is read from the graph.

As shown in Tables 1-1 and 1-2, all of the glasses had predetermined refractive indexes, Abbe's numbers and glass transition temperatures and exhibited excellent low-temperature softening capability and meltability, so that they were suitable as optical glasses for precision press-molding.

Then, a refined and homogenized molten glass having a composition shown in Tables 1-1 and 1-2 was caused to flow out of a pipe made of a platinum alloy that was temperature-adjusted to a temperature range in which the glass could be caused to flow out stably without devitrification, and a molten glass gob having a weight of an intended preform was separated by dropping or by a method in which a leading end of a molten glass was supported and the support was rapidly moved downward to separate a glass gob. Then, the molten glass gob obtained was received with a receiving mold having a gas ejection port in a bottom, and the glass gob was shaped into a press-molding preform while a gas was ejected from the gas ejection port. In the above manner, preforms were produced, and concerning the form of preforms, the preforms had a form of a sphere or an oblate sphere provided by

TABLE 1-1

|  | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| $P^{5+}$ | 26.0 | 27.0 | 27.0 | 27.0 | 27.0 | 27.0 | 27.0 | 33.0 | 29.0 | 27.0 | 27.0 | 26.0 | 13.0 | 17.0 |
| $Al^{3+}$ | 20.0 | 21.0 | 21.0 | 21.0 | 21.0 | 21.0 | 21.0 | 21.0 | 19.1 | 15.0 | 11.0 | 21.0 | 21.0 | 27.0 |
| $Mg^{2+}$ | 10.0 | 4.0 | 8.0 | 8.0 | 12.0 | 7.3 | 4.9 | 6.3 | 6.6 | 8.3 | 9.0 | 7.5 | 9.7 | 8.0 |
| $Ca^{2+}$ | 17.0 | 14.0 | 18.0 | 19.5 | 14.0 | 9.1 | 6.2 | 7.9 | 8.3 | 10.5 | 11.3 | 9.3 | 12.1 | 10.0 |
| $Sr^{2+}$ | 17.0 | 17.0 | 17.0 | 17.0 | 17.0 | 15.6 | 10.5 | 13.4 | 14.1 | 17.7 | 19.2 | 15.9 | 20.7 | 17.0 |
| $Ba^{2+}$ | 5.0 | 12.0 | 6.0 | 4.5 | 6.0 | 11.0 | 7.4 | 9.4 | 9.9 | 12.5 | 13.5 | 11.3 | 14.5 | 12.0 |
| $Li^+$ | 4.0 | 4.0 | 2.0 | 2.0 | 2.0 | 8.0 | 22.0 | 8.0 | 12.0 | 8.0 | 8.0 | 8.0 | 8.0 | 8.0 |
| $Na^+$ | 0.0 | 0.0 | 0.0 | 0.0 | 0.0 | 0.0 | 0.0 | 0.0 | 0.0 | 0.0 | 0.0 | 0.0 | 0.0 | 0.0 |
| $Y^{3+}$ | 1.0 | 1.0 | 1.0 | 1.0 | 1.0 | 1.0 | 1.0 | 1.0 | 1.0 | 1.0 | 1.0 | 1.0 | 1.0 | 1.0 |
| Total content | 100 | 100 | 100 | 100 | 100 | 100 | 100 | 100 | 100 | 100 | 100 | 100 | 100 | 100 |
| $F^-/(F^- + O^{2-})$ | 0.641 | 0.628 | 0.632 | 0.632 | 0.632 | 0.621 | 0.595 | 0.538 | 0.582 | 0.611 | 0.603 | 0.635 | 0.818 | 0.768 |
| $T_g$ [° C.] | 428 | 430 | 446 | 445 | 449 | 417 | 359 | 420 | 396 | 393 | 383 | 406 | 383 | 400 |
| $N_d$ | 1.490 | 1.503 | 1.495 | 1.494 | 1.493 | 1.500 | 1.488 | 1.511 | 1.505 | 1.505 | 1.507 | 1.495 | 1.464 | 1.468 |
| $v_d$ | 82 | 81 | 82 | 81 | 82 | 81 | 81 | 79 | 79 | 80 | 79 | 82 | 88 | 88 |
| Temperature at which viscosity of 30 dPa·s is shown [° C.] | — | — | — | — | — | 665 | — | — | — | 642 | — | 648 | — | — |

TABLE 1-2

|  | 15 | 16 | 17 | 18 | 19 | 20 | 21 | 22 | 23 | 24 | 25 |
|---|---|---|---|---|---|---|---|---|---|---|---|
| $P^{5+}$ | 38.0 | 38 | 34 | 38 | 38 | 29 | 29 | 31 | 38 | 35 | 35 |
| $Al^{3+}$ | 17.0 | 9 | 9 | 9 | 9 | 9 | 9 | 9 | 9 | 12 | 9 |
| $Mg^{2+}$ | 0 | 6 | 6 | 4 | 6 | 6 | 6 | 10 | 6 | 6 | 9 |
| $Ca^{2+}$ | 4.0 | 4 | 8 | 6 | 4 | 2 | 4 | 4 | 4 | 4 | 4 |
| $Sr^{2+}$ | 5.0 | 5 | 13 | 5 | 5 | 5 | 5 | 5 | 5 | 5 | 5 |
| $Ba^{2+}$ | 22.0 | 16 | 16 | 16 | 16 | 27 | 23 | 19 | 16 | 16 | 16 |
| $Li^+$ | 13.0 | 21 | 13 | 21 | 21 | 21 | 21 | 21 | 18 | 21 | 21 |
| $Na^+$ | 0.0 | 0 | 0 | 0 | 0 | 0 | 0 | 0 | 3 | 0 | 0 |
| $Y^{3+}$ | 1.0 | 1 | 1 | 1 | 1 | 1 | 3 | 1 | 1 | 1 | 1 |
| Total content | 100 | 100 | 100 | 100 | 100 | 100 | 100 | 100 | 100 | 100 | 100 |
| $F^-/(F^- + O^{2-})$ | 0.389 | 0.335 | 0.375 | 0.335 | 0.274 | 0.423 | 0.429 | 0.416 | 0.335 | 0.390 | 0.380 |
| $T_g$ [° C.] | 427 | 374 | 420 | 372 | 392 | 367 | 367 | 364 | 357 | 366 | 355 |
| $N_d$ | 1.553 | 1.5499 | 1.55049 | 1.55224 | 1.55772 | 1.54692 | 1.54567 | 1.5357 | 1.54194 | 1.5353 | 1.53816 |
| $v_d$ | 73 | 71.5 | 72.2 | 71.0 | 70.8 | 72.3 | 72.6 | 73.4 | 71.5 | 72.9 | 72.3 |
| Temperature at which viscosity of 30 dPa·s is shown [° C.] | — | 625 | 660 | — | 650 | 630 | 625 | 625 | 650 | 640 | — | adjusting and setting intervals of separating molten glasses. The weight of each of the thus-obtained preforms was accurately in agreement with a set value, and all the preforms had smooth surfaces.

In order to take all possible measures to secure that the preforms had no remaining striae, each of the shaped and annealed preforms was entirely immersed in a hydrochloric solution as an etching solution, to remove the entire surface of each preform, and the preforms were cleaned and dried to give optically uniform preforms.

In an alternative method, the entire surface of each of shaped spherical preforms was ground and polished according to a known method to remove the entire surface, whereby optically uniform preforms were obtained.

Separately, each of the molten glasses was independently cast into a casting mold to shape them in the form of a plate-like glass or a columnar rod shape, and the shaped glasses were annealed. Then, each shaped glasses was cut to obtain glass pieces, and the glass pieces were ground and polished to give preforms of which the entire surface each was smooth.

The thus-obtained preforms were precision press-molded with a pressing apparatus shown in FIG. 1 to give aspherical lenses. Specifically, a preform 4 was placed between a lower mold member 2 and an upper mold member 1 of a press mold having the upper mold member 1, the lower mold member 2 and a sleeve 3. Then, an atmosphere in a quartz tube 11 was replaced with a nitrogen atmosphere, and a heater 12 was electrically powered to heat an inside of the quartz tube 11. The temperature inside the press mold was set at a temperature at which a glass to be molded would exhibit a viscosity of $10^8$ to $10^{10}$ dPa·s, and while this temperature was maintained, a pressing rod 13 was moved downward to press the upper mold member 1 to press the preforms set in the press mold. The pressing was carried out at a pressure of 8 MPa for 30 seconds. After the pressing, the pressure for the pressing was removed, and in a state where a glass molded product obtained by the press molding was in contact with the lower mold member 2 and the upper mold member 1, the glass molded product was gradually cooled to a temperature at which the glass exhibited a viscosity of $10^{12}$ dPa·s or higher. Then, the glass molded product was rapidly cooled to room temperature and taken out of the press mold to give an aspherical lens. Aspherical lenses obtained in the above manner had remarkably high surface accuracy.

In FIG. 1, reference numeral 9 indicates a support rod, a reference numeral 10 indicates a holder for the lower mold member and the sleeve, and reference numeral 14 indicates a thermocouple.

The aspherical lenses obtained by the precision press-molding were provided with anti-reflection films as required.

The same preforms as the above preforms were precision press-molded by the following method different from the above method. In this method, first, a preform was pre-heated to a temperature at which a glass constituting the preform had a viscosity of $10^8$ dPa·s while the preform was caused to float. Separately, a press mold having an upper mold member, a lower mold member and a sleeve was heated to a temperature at which the glass constituting the above preform exhibited a viscosity of $10^9$ to $10^{12}$ dPa·s. The above pre-heated preform was introduced into the cavity of the press mold and precision press-molded at 10 MPa. Concurrently with the start of the pressing, cooling of the glass and the press mold was started and continued until the molded glass had a viscosity of $10^{12}$ dPa·s or more, and then the molded product was taken out of the press mold to give an aspherical lens. Aspherical lenses obtained in the above manner had remarkably high surface accuracy.

The aspherical lenses obtained by the precision press-molding were provided with anti-reflection films as required. In the above manner, optical elements having high internal quality were highly productively produced with high accuracy.

INDUSTRIAL UTILITY

According to the present invention, there can be obtained an optical glass that has the property of low-dispersion and has a low glass transition temperature and that has the low-temperature softening property which enables precision press-molding, and the above optical glass can be used for producing press-molding preforms and further for optical elements such as various lenses.

The invention claimed is:
1. An optical glass that is a fluorophosphate glass comprising, as essential cationic components, $P^{5+}$, $Al^{3+}$, at least two members selected from $Mg^{2+}$, $Ca^{2+}$, $Sr^{2+}$ and $Ba^{2+}$ as divalent cationic components ($R^{2+}$) and $Li^+$ and comprising, by cationic %,
10 to 45% of $P^{5+}$,
5 to 30% of $Al^{3+}$,
0 to 20% of $Mg^{2+}$,
0 to 25% of $Ca^{2+}$,
0 to 30% of $Sr^{2+}$,
0 to 33% of $Ba^{2+}$,
1 to 30% of $Li^+$,
0 to 10% of $Na^+$,
0 to 10% of $K^+$,
0 to 5% of $Y^{3+}$,
and
0 to 15% of $B^{3+}$,
the molar ratio of the content of $F^-$ to the total content of $F^-$ and $O^{2-}$, $F^-/(F^-+O^{2-})$, being 0.25 to 0.85,
the optical glass
(1) having a refractive index ($N_d$) of 1.40 to 1.58 and an Abbe's number ($v_d$) of 67 to 90, and
(2) exhibiting a transmittance (excluding a reflection loss on sample surfaces) of at least 80% over a wavelength range of 400 nm to 2,000 nm when a glass sample having flat surfaces in parallel with each other and having a thickness of 10 mm is prepared and light is caused to enter the sample from the direction perpendicular to the above surfaces.

2. The optical glass of claim 1, which contains, as divalent cationic components ($R^{2+}$), at least two members of $Ca^{2+}$, $Sr^{2+}$, and $Ba^{2+}$.

3. The optical glass of claim 1, wherein a total content of $Mg^{2+}$, $Ca^{2+}$, $Sr^{2+}$ and $Ba^{2+}$ as divalent cationic components ($R^{2+}$) is at least 1 cationic %.

4. The optical glass of claim 1, wherein a content of each of $Mg^{2+}$, $Ca^{2+}$, $Sr^{2+}$ and $Ba^{2+}$ as divalent cationic components ($R^{2+}$) is at least 1 cationic %.

5. An optical glass which is a fluorophosphate glass and which exhibits
viscosity of 30 dPa·s at a temperature of 700° C. or lower, and
a transmittance (excluding a reflection loss on sample surfaces) of at least 80% over a wavelength range of 400 nm to 2,000 nm when a glass sample having flat surfaces in parallel with each other and having a thickness of 10 mm is prepared and light is caused to enter the sample from the direction perpendicular to the above surfaces.

6. The optical glass of claim 5, which contains 1 to 30 cationic % of $Li^+$.

7. The an optical glass of claim 1, which is for use in precision press-molding.

8. A press-molding preform formed of the optical glass of claim 1.

9. An optical element formed of an optical glass of claim 1.

10. A process for the production of an optical element, which comprises heating and precision press-molding the preform of claim 8.

11. The process for the production of an optical element as recited in claim 10, wherein said preform is introduced into a press mold and said press mold and the preform are heated together to carry out the precision press-molding.

12. The process for the production of an optical element as recited in claim 10, wherein said preform, which is hot after heated, is introduced to a pre-heated press mold to carry out the precision press-molding.

13. The optical glass of claim 1, in which the transmittance is at least 95%.

14. The optical glass of claim 5, in which the transmittance is at least 95%.

15. The optical glass of claim 1, in which the total content of $P^{5+}$, $Al^{3+}$, $Mg^{2+}$, $Ca^{2+}$, $Sr^{2+}$, $Ba^{2+}$, $Li^+$ and $Y^{3+}$ is over 99%.

16. The optical glass of claim 5, which contains $P^{5+}$, $Al^{3+}$, $Mg^{2+}$, $Ca^{2+}$, $Sr^{2+}$, $Ba^{2+}$, $Li^+$ and $Y^{3+}$ and the total content of these is over 99%.

* * * * *